No. 784,693. PATENTED MAR. 14, 1905.
F. LJUNGSTRÖM.
MILKING MACHINE.
APPLICATION FILED APR. 15, 1903.
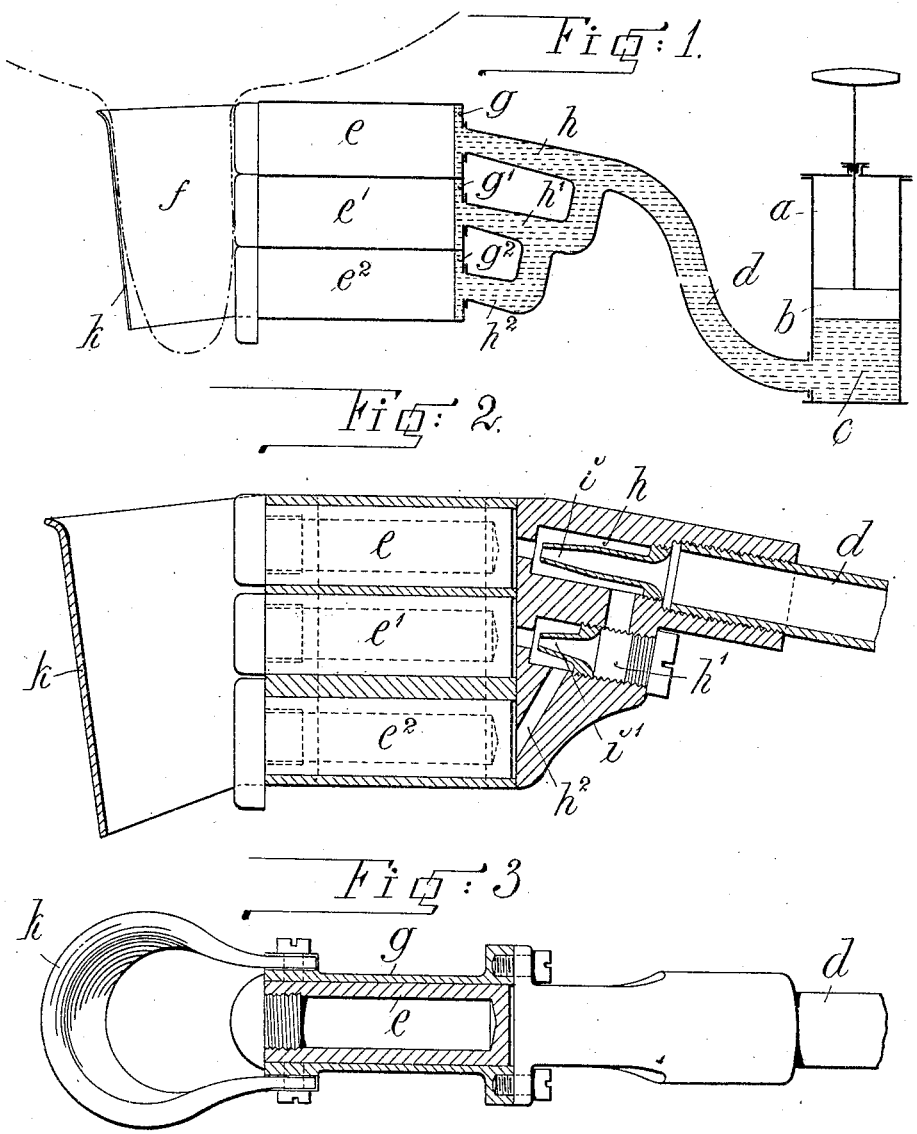

No. 784,693. Patented March 14, 1905.

UNITED STATES PATENT OFFICE.

FREDRIK LJUNGSTRÖM, OF STOCKHOLM, SWEDEN.

MILKING-MACHINE.

SPECIFICATION forming part of Letters Patent No. 784,693, dated March 14, 1905.

Application filed April 15, 1903. Serial No. 152,768.

*To all whom it may concern:*

Be it known that I, FREDRIK LJUNGSTRÖM, a subject of the King of Sweden and Norway, residing at Stockholm, Sweden, have invented certain new and useful Improvements in Mechanically-Operated Milking Devices for Milking-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to a mechanically-operated device for acting upon the teats of cows for the extraction of the milk from the udder.

The principle embodied in my said invention is as follows: to construct a milking device acting upon the teats in about the same manner as the fingers by hand-milking—viz., producing repeated pressures on the teats, beginning at their root and successively continuing toward their extremities—furthermore, to construct a driving motion for said milking organs in a simple manner and so that only a soft pressure on the teats is produced in order that the milking device may not have an injurious effect on the cows.

My invention consists, broadly, of a set of pistons moving in cylinders and successively acting upon the teats, thereby pressing them against a fixed resisting body or abutment whereby the milk is extracted; further, of the art of motion of said pistons and means for producing said motion—namely, by means of the streaming energy of a body of liquid contained in a determined space communicating with the cylinders of the milking organ and brought in a streaming motion to and fro by suitable means in such way that the liquid is alternately pressed in the cylinders and sucked out from them.

In the accompanying drawings, Figure 1 is a schematic representation of the principle of my invention. Fig. 2 illustrates more in detail the milking device acting upon the teat. Fig. 3 is a top view of the same device.

Similar characters of reference indicate like parts.

Taking the schematic representation in Fig. 1, $a$ is the cylinder of a hand-pump, and $b$ is the piston, pressing upon the liquid contained in the cylinder. $d$ is a conduit connecting the lower part of the pump-cylinder with the milking device. This latter consists of a set of pistons $e\ e'\ e^2$, moving in cylinders $g\ g'\ g^2$, placed one above the other and fixed together by suitable means. The cylinders are provided with openings at their hind ends, communicating by branches $h$, $h'$, and $h^2$ with the conduit $d$. The pistons $e\ e'\ e^2$ move tightly in the cylinders, which at their posterior ends are open, so that the pistons can be pushed out a certain part of their length. On the posterior end of the united cylinders is fixed a shell $k$, in which the teat is introduced. It is easy to understand that when the pistons are pushed out of the cylinders they will exercise a pressing action on the teat, so that the uppermost piston presses on the root of teat, the intermediate piston on the middle part, and the lowest piston on the extremity of the teat. Owing to the fact that the branches $h'$ and $h^2$ are located at the side of the conduit $d$, the streaming energy will of course act later in the said branches than in the branch $h$, which forms a direct continuation of the conduit $d$. In consequence the piston $e'$ is acted upon and pushed out a little later than the piston $e$ and the piston $e^2$ in its turn a little later than the piston $e'$.

The teat which at the side opposite to the pistons is embraced by the shell $k$, conveniently made of transparent celluloid, performs the function of a resistance body or abutment against which the teat is pressed, is thus subjected to a pressure beginning at the root and continuing downward, and thus corresponding fully to the action arising at a common milking operation by hand, where the fingers of the hand, with respect to function, are to be compared with the pistons $e\ e'\ e^2$, described above. It may be added hereto that the topmost piston $e$ is acted upon not only first and most rapidly, but also most forcibly, inasmuch as a surplus of pressure will be acting upon the same very nearly corresponding to the total strain of pressure upon the two pistons $e'$ and $e^2$. For the due function of the piston $e$ after having been pressed out so far as possible it is of course requisite that the said piston shall continue to support the whole pressure transmitted through the conduit $d$; otherwise no pressure at all would be exercised in the conduits $h'$ and $h^2$. This circumstance is favorable in so far as the piston $e$ keeps the teat steadily pressed together at the root from the beginning to the end of each milking movement, and thus security is obtained that the two lower pistons $e'$ and $e^2$ cannot by their motions drive the milk upward again, and thus counteract the milking operation. It is to be observed, moreover, that the body of liquid passing direct through $d$ and $h$ has in a certain degree an injectory action upon the body of liquid in the branch $h'$, whereby the streaming energy in this latter branch will be postponed, and thus the desired later action upon the piston $e'$ will be accentuated. By the same reason the liquid streaming in $h'$ postpones the streaming energy in the branch $h^2$. The ramification of the conduit $d$ can for the rest be made in any way soever, provided that the above successive action upon the pistons $e$ $e'$ $e^2$ be effected. When the piston $b$ is pushed out of the pump-cylinder $a$, the liquid $e$ will obviously return to the pump, and the streaming energy imparted thereby to the liquid is thus compelled to act first upon the piston $e$ and then successively upon the pistons $e'$ and $e^2$. The teat $f$ will also at each milking movement not only be first pressed together at the root, but also first released at the root.

The milking device represented in full in Figs. 2 and 3 is carried out according to the principle represented in Fig. 1. The conduit is here terminated by a nozzle $i$, surrounded by a space communicating with the branch $h'$, this branch terminating likewise in a nozzle $i'$, surrounded by a space communicating with the branch $h^2$. The inner ends of the nozzles are directed toward the openings of the respective cylinders $g$ and $g'$. These nozzles are not only intended to lead the streaming energy of the liquid so much as possible directly into the cylinders $g$ and $g'$, but also to augment the above-named injectory action.

In practice I combine four milking devices of the above-described construction with each other by suitable means and adjustably in order that each of them may correspond to each of the four teats, and I connect the conduits from each milking device with the pump-cylinder in order that the milk by the movement of the pump may be extracted from all four teats simultaneously.

By augmenting the capacity of the pump a single pump can be used for operating several milking-machines.

I claim—

1. A milking apparatus comprising an abutment for the teat, pistons arranged at right angles to the major axis of said abutment, the cylinders for said pistons, a receptacle for fluid in communication with said cylinders, a forcing and suction device to move the body of fluid to and fro and therethrough to move the pistons toward and from the abutment, and means dividing said body of fluid so as to cause the pistons to move successively to and from the abutment, for the purpose set forth.

2. A milking apparatus comprising an abutment for the teat, pistons arranged at right angles to the major axis of said abutment, the cylinders for said pistons, a receptacle for fluid in communication with said cylinders, a forcing and suction device to move the body of fluid to and fro and therethrough to move the pistons toward and from the abutment, and means dividing said body of fluid so as to cause the pistons to move successively to and from the abutment and to cause the successive pistons to move toward the abutment under successive reduced pressure, for the purpose set forth.

3. In a milking apparatus, a milking device consisting, for each teat, of a set of pistons moving in cylinders and bearing against and acting successively on the teat, a shell fixed to the cylinders and surrounding the teats, each of said cylinders communicating with a closed conduit containing a body of fluid, and means for imparting energy to said body of fluid acting upon the pistons.

4. In a milking apparatus, a milking device consisting, for each teat, of a set of pistons moving in cylinders and bearing against and successively acting upon the teat, a shell surrounding the teat and fixed to the cylinders, the uppermost cylinder communicating directly with a closed conduit containing a body of fluid, whereas the next cylinder communicates with the said conduit by a branch, the next cylinder by a branch with the former branch, and means for imparting energy to said body of fluid.

5. In a milking apparatus, a milking device consisting, for each teat, of a set of pistons moving in cylinders and bearing against and successively acting upon the teat, a shell surrounding the teat and fixed with its ends to the cylinders, and acting as an abutment for the teat, the uppermost cylinder communicating directly with a closed conduit containing a body of fluid, whereas the next cylinder communicates with said conduit by a branch, the next cylinder by a branch with the former branch and a pump whose cylinder communicates with the closed circuit.

6. In a milking apparatus, a milking device consisting, for each teat, of a set of pistons moving in cylinders and bearing against and successively acting upon the teat, a shell surrounding the teat and fixed with its ends to the cylinders and acting as an abutment for the teat, the uppermost cylinder communicating directly with a closed circuit containing a body of fluid, whereas the next cylinder communicates with said conduit by a branch, the next cylinder by a branch with the former branch, the closed conduit and one or more of the branches being terminated by nozzles each surrounded by a space communicating with the cylinders, and a pump whose cylinder communicates with the closed circuit.

In testimony that I claim the foregoing as my invention I have signed my name in presence of two subscribing witnesses.

FREDRIK LJUNGSTRÖM.

Witnesses:
 TH. WAWRINSKY,
 KOWR DAHLQVIST.